United States Patent Office 3,772,397
Patented Nov. 13, 1973

3,772,397
HYDROCARBON ISOMERIZATION PROCESS
Richard E. Rausch, Mundelein, Ill., assignor to Universal Oil Products Company, Des Plaines, Ill.
No Drawing. Application Apr. 25, 1969, Ser. No. 819,456, now Patent No. 3,632,525, which is a continuation-in-part of application Ser. No. 807,910, Mar. 14, 1969. Divided and this application July 30, 1971, Ser. No. 167,796
Int. Cl. C07c 5/24
U.S. Cl. 260—668 A          15 Claims

ABSTRACT OF THE DISCLOSURE

Isomerizable hydrocarbons are isomerized using a catalytic composite comprising a combination of a platinum group component and a tin component with a porous carrier material.

CROSS-REFERENCES TO RELATED APPLICATIONS

This application is a division of my copending application Ser. No. 819,456, filed Apr. 25, 1969, now U.S. Pat. No. 3,632,525, which copending application is a continuation-in-part of my copending application Ser. No. 807,910, filed Mar. 14, 1969, the teachings of both of which copending applications are specifically incorporated herein.

BACKGROUND OF THE INVENTION

This invention relates to a process for isomerizing isomerizable hydrocarbons including isomerizable paraffins, cycloparaffins, olefins and alkylaromatics. More particularly, this invention relates to a process for isomerizing isomerizable hydrocarbons with a catalytic composite comprising a combination of platinum group component and a tin component with a porous carrier material. The present invention utilizes a dual-function catalytic composite having both a hydrogenation-dehydrogenation function and a cracking function which enables substantial improvements in hydrocarbon isomerization processes that have traditionally used dual-function catalysts.

Processes for the isomerization of hydrocarbons have acquired significant importance within the petrochemical and petroleum refining industry. The demand for paraxylene has created a demand for processes to isomerize other xylene isomers and ethylbenzene to produce paraxylene. The demand for certain branched chain paraffins, such as isobutane or isopentane, as intermediates in producing high octane motor fuel alkylate, can be met by isomerizing the corresponding normal paraffins. It is desired that the alkylate be highly branched to provide a high octane rating. This can be accomplished by alkylating an isoparaffin with $C_4$–$C_7$ internal olefins which, in turn, can be produced by isomerization of corresponding linear alpha-olefins.

Catalytic composites exhibiting a dual hydrogenation-dehydrogenation function and a cracking function are widely used in the petroleum and petrochemical industry to isomerize hydrocarbons. Such catalysts are generally characterized as having a heavy metal component, e.g., metals or metallic compounds of Group V through VIII of the Periodic Table, to impart a hydrogenation-dehydrogenation function when associated with an acid-acting, adsorptive, refractory, inorganic oxide which imparts a cracking function. In these isomerization reactions, it is important that the catalytic composite not only catalyze the specific isomerization reaction involved by having its dual hydrogenation-dehydrogenation function correctly balanced against its cracking function, but also that the catalyst perform its desired functions well over prolonged periods of time.

The performance of a given catalyst in a hydrocarbon isomerization process is typically measured by the activity, selectivity, and stability of the catalyst. Activity refers to the ability to isomerize the hydrocarbon reactants into the corresponding isomers at a specified set of reaction conditions; selectivity refers to the percent of reactants isomerized to form the desired isomerized product and/or products; stability refers to the rate of change of the selectivity and activity of the catalyst.

The principal cause of instability (i.e., loss of selectivity and activity in an originally selective, active catalyst) is the formation of coke on the catalytic surface of the catalyst during the reaction. This coke is characterizable as a high molecular weight hydrogen-deficient carbonaceous material, typically having an atomic carbon to hydrogen ratio of about 1 or more. Thus, a problem in the hydrocarbon isomerization art is the development of more active and selective composites not sensitive to the carbonaceous materials and/or having the ability to suppress the rate of the formation of these carbonaceous materials on the catalyst. A primary aim of the art is to develop a hydrocarbon isomerization process utilizing a dual-function catalyst having superior activity, selectivity, and stability. In particular, it is desired to have a process wherein hydrocarbons are isomerized without excessive cracking or other decomposition reactions which lower the overall yield of the process and make it more difficult to operate.

SUMMARY OF THE INVENTION

Accordingly, it is an object of this invention to provide a process for isomerizing isomerizable hydrocarbons. More specifically, it is an object of this invention to provide an isomerization process using a particular isomerization catalyst effective in isomerizing isomerizable hydrocarbons without introducing undesired decomposition and/or cracking reactions. It is a further object of this invention to provide a process for isomerizing isomerizable hydrocarbons utilizing a dual-function catalyst having superior activity, selectivity and stability.

An isomerization process has now been developed utilizing a dual-function catalyst which possesses improved activity, selectivity and stability. Moreover, in the particular case of a $C_8$ alkylaromatic isomerization process, this catalyst produces essentially equilibrium conversions of the $C_8$ alkylaromatics with essentially stoichiometric selectivity without evidencing excessive production of hydrogenated or cracked products. Further, this activity and selectivity is readily maintainable at its originally high levels, thus yielding a very stable catalytic alkylaromatic isomerization process. This catalyst utilizes a relatively inexpensive component, tin, to promote a platinum metal component when utilized with an acid-acting porous carrier material.

In a broad embodiment, this invention relates to a process for isomerizing an isomerizable hydrocarbon which comprises contacting said hydrocarbon at isomerization conditions with a catalytic composite comprising a combination of a platinum group component and a tin component with a porous carrier material.

In a more limited embodiment, this invention relates to an isomerization process utilizing a catalytic composite comprising a combination of a platinum component, a tin component, and a halogen component with an alumina carrier material. These components are preferably present in the composite in amounts sufficient to result in the final composite containing, on an elemental basis, about 0.1 to about 5.0 wt. percent halogen, about 0.01 to about 1.0 wt. percent platinum, and about 0.01 to about 5.0 wt. percent tin.

In a more specific embodiment, this invention relates to the isomerization of either a saturated or olefinic isomerizable hydrocarbon by contacting the hydrocarbon with the aforementioned catalytic composites at isomerization conditions which include a temperature of about 0° C. to about 425° C., a pressure of about atmospheric to about 100 atmospheres and a liquid hourly space velocity of about 0.1 to about 10. In another limited embodiment this process relates to the isomerization of an isomerizable alkylaromatic hydrocarbon by contacting the alkylaromatic with the aforementioned catalytic composites at isomerization conditions which include a temperature of about 0° C. to about 600° C., a pressure of about atmospheric to about 100 atmospheres, a liquid hourly space velocity of about 0.1 to about 20.0$^{-1}$ and a hydrogen to hydrocarbon mole ratio of about 1:1 to about 20:1.

Other objects and embodiments referring to alternative isomerizable hydrocarbons and to alternative catalytic compositions will be found in the following further detailed description of this invention.

DESCRIPTION OF PREFERRED EMBODIMENTS

The process of this invention is applicable to the isomerization of isomerizable saturated hydrocarbons including acyclic paraffins and cyclic naphthenes and is particularly suitable for the isomerization of straight chain or mildly branched chain paraffins containing 4 or more carbon atoms per molecule such as normal butane, normal pentane, normal hexane, normal heptane, normal octane, etc., and mixtures thereof. Cycloparaffins applicable are those containing at least 5 carbon atoms in the ring such as alkylcyclopentanes and cyclohexanes, including methylcyclopentane, dimethylcyclopentane, cyclohexane, methylcyclohexane, dimethylcyclohexane, etc. This process also applies to the conversion of mixtures of paraffins and/or naphthenes such as those derived by selective fractionation and distillation of straight-run natural gasolines and naphthas. Such mixtures of paraffins and/or naphthenes include the so-called pentane fractions, hexane fractions, and mixtures thereof. It is not intended, however, to limit this invention to these enumerated saturated hydrocarbons and it is contemplated that straight or branched chain saturated hydrocarbon containing up to about 20 carbon atoms per molecule may be isomerized according to the process of the present invention with $C_4$-$C_9$ hydrocarbons being particularly preferred.

The olefins applicable within this isomerization process are generally a mixture of olefinic hydrocarbons of approximately the same molecular weight, including the 1-isomer, 2-isomer and other position isomers, capable of undergoing isomerization to an olefin in which the double bond occupies a more centrally located position in the hydrocarbon chain. The process of this invention can be used to provide an olefinic feedstock for motor fuel alkylation purposes containing an optimum amount of the more centrally located double bond isomers, by converting the 1-isomer, or other near-terminal-position isomer into olefins wherein the double bond is more centrally located in the carbon atoms chain. The process of this invention is applicable to the isomerization of such isomerizable olefinic hydrocarbons as 1-butene to 2-butene or 3-methyl-1-butene to 2-methyl-2-butene. The process of this invention can be utilized to shift the double bond of an olefinic hydrocarbon such as 1-pentene, 1-hexene, 2-hexene or 4-methyl-1-pentene to a more centrally located position so that 2-pentene, 2-hexene, 3-hexene or 4-methyl-2-pentene, respectively, can be obtained. It is not intended to limit this invention to the enumerated olefinic hydrocarbons. It is contemplated that shifting the double bond to a more centrally located position may be effective in straight or branched chain olefinic hydrocarbons containing up to about 20 carbon atoms per molecule. The process of this invention also applies to the hydroisomerization of olefins whrerein olefins are converted to branched-chain paraffins and/or branched olefins.

Further, the process of this invention is also applicable to the isomerization of isomerizable alkylaromatic hydrocarbons, e.g., ortho-xylene, meta-xylene, para-xylene, ethylbenzene, the ethyltoluenes, the trimethylbenzenes, the diethylbenzenes, the triethylbenzenes, normal propylbenzene, isopropylbenzene, etc., and mixtures thereof. Preferred isomerizable alkylaromatic hydrocarbons are the alkyl benzene hydrocarbons, particularly the $C_8$ alkylbenzenes, and nonequilibrium mixtures of various $C_8$ aromatic isomers. Higher molecular weight alkylaromatic hydrocarbons such as the alkylnaphthalenes, the alkylanthracenes, the alkylphenanthrenes, etc., are also suitable.

The isomerizable hydrocarbons may be derived as selective fractions from various naturally-occurring petroleum streams either as individual components or as certain boiling range fractions obtained by the selective fractionation and distillation of catalytically cracked gas oil. The process of this invention may be successfully utilized for complete conversion of isomerizable hydrocarbons when they are present in minor quantities in various fluid or gaseous streams; i.e., the isomerizable hydrocarbons for use in the process of this invention need not be concentrated. For example, isomerizable hydrocarbons appear in minor quantities in various refinery offstreams, usually diluted with gases such as hydrogen, nitrogen, methane, ethane, propane, etc. These offstreams, containing minor quantities of isomerizable hydrocarbons, are obtained in various refinery installations including thermal cracking units, catalytic cracking units, thermal reforming units, coking units, polymerization units, dehydrogenation units, etc., and have in the past been burned as fuel, since an economical process for the utilization of the hydrocarbon content has not been available. This is particularly true of refinery fluid streams which contain minor quantities of isomerizable hydrocarbons. The process of this invention is capable of isomerizing aromatic streams, such as reformate, to produce xylenes, particularly paraxylene, thus upgrading the reformate from its gasoline value to a high petrochemical value.

As hereinbefore indicated, the catalyst utilized in the process of the present invention comprises a porous carrier material or support having combined therewith a platinum group component, a tin component, and in the preferred case, a halogen component. Considering first the porous carrier material utilized in this catalyst, it is preferred that the material be a porous, adsorptive, high-surface area support having a surface area of about 25 to about 500 m.$^2$/gm. The porous carrier material should be relatively refractory to the conditions utilized in the hydrocarbon conversion process, and it is intended to include within the scope of the process of the present invention, carrier materials which have traditionally been utilized in dual-function hydrocarbon conversion catalysts such as: (1) activated carbon, coke or charcoal; (2) silica or silica gel, clays and silicates including those synthetically prepared and naturally-occurring, which may or may not be acid treated, such as, for example, Attapulgus clay, china clay, diatomaceous earth, fuller's earth, kaolin, kieselguhr, etc.; (3) ceramics, porcelain, crushed firebrick, and bauxite; (4) refractory inorganic oxides such as alumina, titanium dioxide, zirconium dioxide, chromium oxide, zinc oxide, magnesa, thoria, boria, silica-alumina, silica-magnesia, chromia-alumna, alumina-boria, silica-zirconia, etc.; (5) crystalline aluminosilicates (also a refractory inorganic oxide) such as naturally-occurring or synthetically-prepared mordenite and/or faujasite, either in the hydrogen form or in a form which has been treated with multi-valent cations; and, (6) combinations of these foregoing carrier materials. The preferred porous carrier materials for use in the present invention are refractory inorganic oxides with best results obtained with an alumina carrier material. Suitable alumina materials are the crystalline aluminas known as the gamma-, eta- and theta-alumina with gamma- or eta-alumina giving best results. In addition, in some embodiments the alumina carrier material may contain minor proportions of other well known refractory inorganic oxides such as silica, zirconia, magnesia, etc.; however, the preferred support is substantially pure gamma- or eta-alumina. The preferred carrier materials have an apparent bulk density of about 0.30 to about 0.70 gm./cc. and surface area characteristics such that the average pore diameter is about 20 to 300 angstroms, the pore volume is about 0.10 to about 1.0 ml./gm. and the surface area is about 100 to about 500 m.$^2$/gm. In general, best results are typically obtained with a gamma-alumina carrier material which is used in the form of spherical particles having a relatively small diameter (i.e., typically about 1/16 inch), an apparent bulk density of about 0.5 gm./cc., a pore volume of about 0.4 ml./gm. and a surface area of about 175 m.$^2$/gm.

The preferred alumina carrier material may be prepared in any suitable manner and may be synthetically prepared or natural-occurring. Whatever type of alumina is employed, it may be activated prior to use by one or more treatments including drying, calcination, steaming, etc., and it may be in a form known as activated alumina, activated alumina of commerce, porous alumina, alumina gel, etc. For example, the alumina support may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention a particularly preferred form of alumina is the sphere. Alumina spheres may be continuously manufactured by the well known oil drop method which comprises: forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and then subjected to a calcination procedure at a temperature of about 850° F. to about 1300° F. for a period of about 1 to about 20 hours. This treatment effects conversion of the alumina hydrogel to the corresponding crystalline gamma-alumina. See U.S. Pat. No. 2,620,314 for additional details.

An essential constituent of the catalyst utilized in the present invention is a tin component. This component may be present as an elemental metal or as a chemical compound such as the oxide, sulfide, halide, etc. This component may be incorporated in the catalytic composite in any suitable manner such as by coprecipitation or cogellation with the porous carrier material, ion exchange with the carrier material or impregnation of the carrier material at any stage in the preparation. It is to be noted that it is intended to include within the scope of the process of the present invention all conventional methods for incorporating a metallic component in a catalytic composite, and the particular method of incorporation used is not an essential feature of the present invention. One preferred method of incorporating the tin component into the catalytic composite involves coprecipitating the tin component during the preparation of the preferred refractory oxide carrier material. In the preferred case, this involves the addition of suitable soluble tin compounds such as stannous or stannic halide to the alumina hydrosol, and then combining the hydrosol with a suitable gelling agent, and dropping the resulting mixture into an oil bath, etc., as hereinbefore explained in detail. Following the calcination step, there is obtained a carrier material comprising an intimate combination of alumina and stannic oxide. Another preferred method of incorporating the tin component into the catalyst composite involves the utilization of a water-soluble compound of tin to impregnate the porous carrier material. Thus, the tin component may be added to the carrier material by commingling the latter with an aqueous solution of a suitable tin salt or water-soluble compound of tin such as stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and the like compounds. The utilization of a tin chloride compound, such as stannous or stannic chloride, is particularly preferred since it facilitates the incorporation of both the tin component and at least a minor amount of the preferred halogen component in a single step. In general, the tin component can be impregnated either prior to, simultaneously with, or after the platinum group metallic component is added to the carrier material. However, I have found that excellent results are obtained when the tin component is impregnated simultaneously with the platinum group metallic component. In fact, I have determined that a preferred impregnation solution contains chloroplatinic acid, hydrogen chloride, and stannous or stannic chloride. Following the impregnation step, the resulting component is typically dried and calcined as explained hereinafter.

As indicated above, the catalyst utilized in the process of the present invention also contains a platinum group component. Although the process of the present invention is specifically directed to the use of a catalytic composite containing platinum, it is intended to include other platinum group metals such as palladium, rhodium, ruthenium, osmium, and iridium, particularly palladium. The platinum group component, such as platinum, may exist within the final catalytic composite as a compound such as an oxide, sulfide, halide, etc., or as an elemental state. Generally, the amount of the platinum group component present in the final catalyst composite is small compared to the quantities of the other components combined therewith. In fact, the platinum group component generally comprises about 0.05 to about 1.0 wt. percent of the final catalytic composite, calculated on an elemental basis. Excellent results are obtained when the catalyst contains about 0.3 to about 0.9 wt. percent of the platinum group metal. The preferred platinum group component is platinum or a compound of platinum.

The platinum group component may be incorporated in the catalytic composite in any suitable manner such as coprecipitation or cogellation with the preferred carrier material, ion-exchange, or impregnation. The preferred method of preparing the catalyst involves the utilization of a water-soluble compound of a platinum group metal to impregnate the carrier material. Thus, the platinum group component may be added to the support by commingling the latter with an aqueous solution of chloroplatinic acid. Other water-soluble compounds of platinum may be employed in impregnation solutions and include ammonium chloroplatinate, platinum chloride, dinitro diamino platinum, etc. The utilization of a platinum chloride compound, such as chloroplatinic acid, is preferred since it facilitates the incorporation of both the platinium component and at least a minor quantity of the preferred halogen component in a single step. Hydrogen chloride is also generally added to the impregnation solution in order to further facilitate the incorporation of the halogen component. In addition, it is generally preferred to impregnate the carrier material after it has been calcined in order to minimize the risk of washing away the valuable platinum metal compounds; however, in some cases it may be advantageous to impregnate the carrier material when it is in a gelled state. Following the impregnation, the resulting impregnated support is dried and subjected to a high temperature calcination or oxidation technique which is explained hereinafter.

Although it is not essential, it is generally preferred to incorporate a halogen component into the catalytic composite utilized in the process of the present invention to impart additional acidity and activity to the catalyst. Accordingly, a preferred embodiment of the present invention utilizes a catalytic composite comprising a combination of a platinum group metallic component, a tin component, and a halogen component with an alumina carrier material. Although the precise form of the chemistry of the association of the halogen component with the carrier material is not entirely known, it is customary in the art to refer to the halogen component as being combined with the carrier material, or with the other ingredients of the catalyst. This combined halogen may be either fluorine, chlorine, iodine, bromine, or mixtures thereof. Of these, fluorine and, particularly, chlorine are preferred for the purposes of the present invention either singly or in combination with each other. The halogen may be added to the carrier material in any suitable manner, either during preparation of the support or before, during or after the addition of the other components. For example, the halogen may be added, at any stage of the preparation of the carrier material or to the calcined carrier material, as an aqueous solution of an acid such as hydrogen fluoride, hydrogen chloride, hydrogen bromide, etc. The halogen component, or a portion thereof, may be composited with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For use in an isomerization process, the halogen will be typically combined with the carrier material in an amount sufficient to result in a final composite that contains about 0.1% to about 10.0 wt. percent and preferably about 0.1 to about 5.0 total weight percent halogen, calculated on an elemental basis. In particular, about 0.2 to about 1.5% by weight chlorine and/or about 0.5 to about 3.5% by weight fluorine yield a very effective, stable isomerization catalyst. In addition, small amounts of chloride or fluoride may be continuously added to the catalyst to offset any halogen loss by commingling a halogen containing compound—i.e., $CCl_4$ with the hydrocarbon feed.

Regarding the amount of the tin component contained in the catalyst utilized in the process of this invention, it is preferably about 0.01 to about 5.0 wt. percent tin, calculated on an elemental basis, although substantially higher amounts of tin may be utilized in some cases. In the case where the tin component is incorporated in the catalyst by coprecipitating it with the preferred alumina carrier material, it is within the scope of the present invention to prepare catalysts containing up to 30 wt. percent tin calculated on an elemental basis. Regardless of the absolute amounts of the tin component and the platinum group component utilized, the atomic ratio of the platinum group metal to the tin metal contained in the catalyst is preferably selected from the range of about .1:1 to about 3:1 with best results achieved at an atomic ratio of about 0.5:1 to 1.5:1. This is particularly true when the total content of the tin component plus the platinum group metallic component in the catalytic composite is fixed in the range of about .15 to about 2.0 wt. percent thereof, calculated on an elemental tin and platinum group metal basis. Accordingly, examples of especially preferred catalytic composites are as follows:

(1) A catalytic composite comprising 0.5 wt. percent tin and 0.75 wt. percent platinum combined with an alumina carrier material;

(2) A catalytic composite comprising .1 wt. percent tin and .65 wt. percent platinum combined with an alumina carrier material;

(3) A catalytic comprising .375 wt. percent tin and .375 wt. percent platinum combined with an alumina carrier material;

(4) A catalytic composite comprising 1.0 wt. percent tin plus 0.5 wt. percent platinum combined with an alumina carrier material; and (5) A catalytic composite comprising 0.25 wt. percent tin and 0.5 wt. percent platinum combined with an alumina carrier material. In an isomerization process, it is generally preferred to also include in the catalytic composite a halogen component in an amount of 0.1 to about 10.0 wt. percent as explained hereinbefore. Accordingly, an especially preferred catalytic composite for use in the isomerization process of this invention comprises a combination of a platinum component, a tin component, and a halogen component with an alumina carrier material in amounts sufficient to results in the catalyst containing, on an elemental basis, about 0.1 to about 10.0 wt. percent halogen, and 0.01 to about 1.0 wt. percent platinum, and about 0.01 to about 5.0 wt. percent tin. In this isomerization process, best results are obtained when the halogen component is chlorine, fluorine or a compound of chlorine or fluorine, and the catalyst contains about 0.1 to about 1.0 wt. percent tin, calculated on an elemental basis.

Regardless of the details of how the components of the catalyst utilized in the process of this invention are combined with the porous carrier material, the final catalyst generally will be dried at a temperature of about 200 to about 600° F. for a period of from about 2 to about 24 hours or more, and finally calcined at a temperature of about 700° F. to about 1100° F. in an air atmosphere for a period of about 0.5 to about 10 hours in order to convert the metallic components substantially to the oxide form. In the case where a halogen component is utilized in the catalyst, best results are generally obtained when the halogen content of the catalyst is adjusted during the calcination step by including a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.2 to about 1.5 wt. percent.

Although not essential, the resulting calcined catalytic composite can be impregnated with an anhydrous Friedel-Crafts type metal halide, particularly aluminum chloride. Other suitable metal halides include aluminum bromide, ferric chloride, ferric bromide, zinc chloride, beryllium chloride, etc. It is preferred that the porous carrier material contain chemically combined hydroxyl groups such as those contained in silica and any of the other aforementioned refractory inorganic oxides including the various crystalline aluminosilicates and clays. Particularly preferred is alumina.

The presence of chemically combined hydroxyl groups in the porous carrier material allows a reaction to occur between the Friedel-Crafts metal halide and the hydroxyl groups of the carrier. For example, aluminum chloride reacts with the hydroxyl groups of alumina to yield $Al-O-AlCl_2$ active centers which enhance the catalytic behavior of the original platinum-tin-alumina composite, particularly for isomerizing $C_4-C_8$ paraffins.

The Friedel-Crafts metal halide can be impregnated onto a calcined catalytic composite containing combined hydroxyl groups by the sublimation of the halide onto the tin-platinum composite under conditions such that the sublimed metal halide is combined with the hydroxyl groups of the composite. This reaction is accompanied by the elimination of from about 0.5 to about 2.0 moles of hydrogen chloride per mole of Friedel-Crafts metal halide reacted. For example, in the case of subliming aluminum chloride which sublimes at about 184° C., suitable impregnation temperatures range from about 190° C. to about 700° C., preferably from about 200° C. to about 600° C. The sublimation can be conducted at atmospheric pressure or under increased pressures and in the presence of diluents such as inert gases, hydrogen and/or light paraffinic hydrocarbons. The impregnation may be conducted batchwise but a preferred method is to pass sublimed $AlCl_3$ vapors in admixture with an inert gas such as hydrogen through a calcined catalyst bed. This method both continuously deposits the $AlCl_3$ and removes the evolved HCl.

The amount of metal halide combined with a tin-platinum composite may range from about 1% to about 100% of the original metal halide-free composite. The final composite has unreacted metal halide removed by treating the composite at a temperature above the sublimation temperature of the halide for a time sufficient to remove therefrom any unreacted metal halide. For $AlCl_3$, temperatures of about 400° C. to about 600° C. and times of from about 1 to about 48 hours are satisfactory.

Although it is not essential, it is preferred that the calcined catalytic composite be subjected to a substantially water-free reduction step prior to its use in the isomerization of hydrocarbons. This step is designed to insure a uniform and finely divided dispersion of the metallic component throughout the carrier material. Preferably, substantially pure and dry hydrogen (i.e., less than 20 vol. p.p.m. $H_2O$) is used as the reducing agent in this step. The reducing agent is contacted with the calcined catalyst at a temperature of about 800° F. to about 1200° F. and for a period of time of about 0.5 to 10 hours or more effective to substantially reduce both metallic components to their elemental state. This reduction treatment may be performed in situ as part of a start-up sequence if precautions are taken to predry the plant to a substantially water-free state and if substantially water-free hydrogen is used.

The resulting reduced catalytic composite may, in some cases, be beneficially subjected to a presulfiding operation designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a hydrogen-hydrogen sulfide mixture having about 10 moles of hydrogen present per mole of hydrogen sulfide at conditions sufficient to effect the desired incorporation of sulfur, generally including a temperature ranging from about 50° F. up to about 1100° F. or more. It is generally a good practice to perform this presulfiding step under substantially water-free conditions.

According to the process of the present invention, a hydrocarbon charge stock, preferably in admixture with hydrogen, is contacted with a catalyst of the type hereinbefore described in a hydrocarbon isomerization zone. Contacting may be effected using the catalyst in a fixed bed system, a moving bed system, a fluidized bed system, or in a batch type operation. In view of the danger of attrition loss of the valuable catalyst and of operational advantages, it is preferred to use a fixed bed system. In this system, a hydrogen-rich gas and the charge stock are preheated by suitable heating means to the desired reaction temperature and then passed into an isomerization zone containing a fixed bed of the catalyst type previously characterized. The conversion zone may be one or more separate reactors with suitable means therebetween to insure that the desired isomerization temperature is maintained at the entrance to each zone. It is to be noted that the reactants may be contacted with the catalyst bed in either upward, downward, or radial flow fashion, and that the reactants may be in the liquid phase, a mixed liquid-vapor phase, or a vapor phase when contacted with the catalyst with best results obtained in a vapor phase.

The process of this invention, utilizing the catalyst described above for isomerizing isomerizable olefinic or saturated hydrocarbons, is preferably effected in a continuous down-flow fixed bed system. One particular method is to pass the hydrocarbons continuously, preferably commingled with about 0.1 to about 10 moles or more of hydrogen per mole of hydrocarbon, to an isomerization reaction zone containing the catalyst, and to maintain the zone at proper isomerization conditions such as a temperature in the range of about 0° to about 425° C. or more and a pressure of about atmospheric to about 100 atmospheres or more. The hydrocarbon is passed over the catalyst at a liquid hourly space velocity (defined as volume of liquid hydrocarbon passed per hour per volume of catalyst) of from about 0.1 to about 10 hr.$^{-1}$ or more. In addition, diluents such as argon, nitrogen, etc. may be present. The isomerized product is continuously withdrawn, separated from the reactor effluent, and recovered by conventional means, preferably fractional distillation, while the unreacted starting material may be recycled to form a portion of the feed stock.

Similarly, the process of this invention for isomerizing an isomerizable alkylaromatic hydrocarbon is preferably effected by contacting the aromatic, in a reaction zone containing the hereinbefore described catalyst, with a fixed catalyst bed by passing the hydrocarbon in a down-flow fashion through the bed, while maintaining the zone at proper alkylaromatic isomerization conditions such as a temperature in the range from about 0° C. to about 600° C. or more, and a pressure of atmospheric to about 100 atmospheres or more. The hydrocarbon is passed, preferably, in admixture with hydrogen at a hydrogen to hydrocarbon mole ratio of about 1:1 to about 25:1 or more, and at a liquid hourly hydrocarbon space velocity of about 0.1 to about 20 hr.$^{-1}$ or more. Other inert diluents such as nitrogen, argon, etc., may be present. The isomerized product is continuously withdrawn, separated from the reactor effluent by conventional means including fractional distillation or crystallization, and recovered.

EXAMPLES

The following examples are given to illustrate the process of this invention in the isomerization of isomerizable hydrocarbons. However, these examples are not presented for purposes of limiting the scope of the invention but in order to further illustrate the embodiments of the present process.

Example I

This example demonstrates a method of preparing the preferred catalytic composite to be utilized in the process of the present invention.

An alumina carrier material comprising 1/16″ spheres was prepared by: forming an alumina hydroxyl chloride sol by dissolving substantially pure aluminum pellets in a hydrochloric acid solution, adding hexamethylene-tetramine to the resulting sol, gelling the resulting solution by dropping it into an oil bath to form spherical particles of an aluminum hydrogel, aging, and washing the resulting particles, and finally drying and calcining the aged and washed particles to form spherical particles of gamma-alumina containing about 0.3 wt. percent combined chloride. Additional details as to this method of preparing the preferred carrier material are given in the teachings of U.S. Pat. No. 2,620,314.

The resulting gamma-alumina particles were then contacted with an impregnation solution containing chloroplatinic acid, hydrogen chloride and stannic chloride in amounts sufficient to yield a final composite containing 0.75 wt. percent platinum and 0.5 wt. percent tin, calculated on an elemental basis. The impregnated spheres were then dried at a temperature of about 300° F. for about an hour and thereafter calcined in an air atmosphere at a temperature of about 925° F. for about 1 hour. The resulting calcined spheres were then contacted with an air stream containing $H_2O$ and HCl in a mole ratio of about 40:1 for about 4 hours at 975° F.

The resulting catalyst particles were analyzed and found to contain, on an elemental basis, about 0.75 wt. percent platinum, about 0.5 wt. percent tin, and about 0.85 wt. percent chloride. The resulting catalyst is designated catalyst A.

Example II

This example illustrates an alternative method for preparing the catalytic composite preferred for use in present invention.

An alumina hydroxyl chloride sol was prepared by dissolving substantially pure aluminum pellets in a hydrochloric acid solution. Thereafter, an amount of stannic chloride calculated to provide a final catalyst containing 0.5 wt. percent tin was dissolved in this sol. Hexamethylenetetramine was then added to the resulting mixture to form a dropping solution which was subsequently gelled by dropping it into an oil bath in a manner selected to form spherical particles of an aluminum hydrogel having an average diameter of about $1/16''$. The resulting spherical hydrogel particles were then aged and washed in an ammoniacal solution, and thereafter dried and calcined to form gamma-alumina particles containing 0.3 wt. percent combined chloride and approximately 0.5 wt. percent tin. Additional details as to the mechanics associated with this method of carrier material preparation are given in the teachings of U.S. Pat. No. 2,620,314.

The resulting particles comprised an intimate combination of tin oxide with alumina. They were then impregnated with an aqueous solution containing chloroplatinic acid and hydrogen chloride in amounts sufficient to yield a final composite containing about 0.75 wt. percent platinum. The impregnated spheres were then dried at a temperature of about 300° F. for about 1 hour and calcined in an air atmosphere at a temperature of about 975° C. for about 1 hour. Thereafter, the resulting calcined spheres were subjected to contact with an air stream containing $H_2O$ and HCl in a mole ratio of about 40:1 for about 4 hours at about 975° F.

Thereafter, the spheres were subjected to a dry-prereduction treatment by contacting them with a substantially pure hydrogen stream containing substantially less than 20 vol. p.p.m. $H_2O$ at a temperature of about 1025° F., a pressure slightly above atmospheric, and a flow rate of the hydrogen stream through the catalyst particles corresponding to a gas hourly space velocity of about 720 hr.$^{-1}$ for a period of about 1 hour. The resulting prereduced catalyst was then contacted with a substantially water-free gaseous mixture of $H_2$ and $H_2S$ of about 10:1 $H_2$ to $H_2S$ mole ratio at conditions substantially identical to those used during the pre-reduction step.

The resulting catalyst was analyzed and found to contain, on an elemental basis, 0.75 wt. percent platinum, about 0.5 wt. percent tin, about 0.85 wt. percent chloride, and about 0.1 wt. percent sulfur. It is hereinafter designated catalyst B. The principal distinctions between catalyst B and catalyst A relate to their method of preparation (the tin component was incorporated in catalyst A by simultaneous impregnation and in catalyst B by coprecipitation with the carrier material) and to the pretreatment performed thereon (i.e., catalyst A was not prereduced and sulfided and is used in the oxidized form with subsequent reduction in situ during start-up, whereas catalyst B was pre-reduced and sulfided).

Example III

A portion of the catalyst prepared in Example I and designated as catalyst A is placed, as a catalytic composite, in a continuous flow fixed bed isomerization plant of conventional design. The charge stock, containing on a wt. percent basis, 20.0% ethylbenzene, 10.0% para-xylene, 50.0% meta-xylene, and 20.0% ortho-xylene is commingled with about 8 moles of hydrogen per mole of hydrocarbon, heated to 400° C., and continuously charged at 4.0 hr.$^{-1}$ liquid hourly space velocity (LHSV) to the reactor which is maintained at a pressure of about 400 p.s.i.g. and 400° C. The resulting product evidences essentially equilibrium conversion to para-xylene with only insignificant amounts of cracked products thus indicating an efficient alkyl-aromatic isomerization catalyst.

Example IV

A portion of the catalyst prepared in Example II and designated as catalyst B is also placed in a continuous-flow fixed-bed isomerization plant of conventional design. The same charge stock utilized in Example III is charged, at the same conditions employed in Example III, to the reactor. The resulting product evidences essentially equilibrium conversion to para-xylene and only insignificant amounts of cracked products with essentially the same yields as obtained in Example III thus indicating that catalyst A and catalyst B, differing only in their method of preparation, are essentially equivalent isomerization catalysts.

Example V

A portion of the catalyst produced by the method of Example I (catalyst A) is placed in a continuous flow, fixed-bed isomerization plant of conventional design as utilized in Examples III and IV. Substantially pure metaxylene is used as a charge stock. The charge stock is commingled with about 8 moles of hydrogen per mole of hydrocarbon, heated to about 390° C., and continuously charged to the reactor which is maintained at a pressure of about 300 p.s.i.g. Substantial conversion of meta-xylene to para-xylene is obtained—i.e., greater than 80% of equilibrium.

Example VI

A catalyst identical to that produced in Example I but containing only 0.40 wt. percent combined chloride is used to isomerize 1-butene in an appropriate isomerization reactor, at a reactor pressure of about 500 p.s.i.g. and a reactor temperature of about 140° C. Substantial conversion to 2-butene is observed.

Example VII

The same catalyst as utilized in Example VI is charged to an appropriate, continuous isomerization reactor of conventional design maintained at a reactor pressure of about 1000 p.s.i.g. and a reactor temperature of about 180° C. 3-methyl-1-butene is continuously passed to this reactor with substantial conversion to 2-methyl-2-butene being observed.

Example VIII

A catalyst, identical to that catalyst produced in Example I except that the gamma-alumina particles are contacted with hydrogen fluoride to provide a 2.9 wt. percent combined fluoride content in the catalyst, is placed in an appropriate continuous isomerization reactor of conventional design maintained at a reactor pressure of about 300 p.s.i.g. and a reactor temperature of about 200° C. Normal hexane is continuously charged to the reactor and an analysis of the product stream shows substantial conversion to 2,2-dimethylbutane, 2,3-dimethylbutane, 2-methylpentane, and 3-methylpentane.

Example IX 200 grams of the reduced platinum-tin-aluminum composite of Example I are placed in a glass-lined rotating autoclave along with 150 grams of anhydrous aluminum chloride. The autoclave is sealed, pressured with 25 p.s.i.g. of hydrogen and heated and rotated for 2 hours at 300° C. The autoclave is then allowed to cool, depressured through a caustic scrubber, opened and the final composite removed therefrom. An analysis of this composite indicates a 15 wt. percent gain based on the original composite, equivalent to the aluminum chloride sublimed and reacted thereon. The caustic scrubber is found to have absorbed hydrogen chloride equivalent to about 5.0 wt. percent of the original composite corresponding to about 0.8 mole of HCl evolved per mole of aluminum chloride adsorbed.

Example X

A portion of the catalyst prepared in Example IX is placed in an appropriate continuous isomerization apparatus and used to isomerize normal butane at a reactor pressure of 300 p.s.i.g., a 0.5 hydrogen to hydrocarbon mole ratio, a 1.0 liquid hourly space velocity, and a reactor temperature of 230° C. Substantial conversion of normal butane to isobutane is observed—i.e., approximately a conversion of normal butane to isobutane of about 45 wt. percent of the original butane charged.

Example XI

A portion of the catalyst as prepared in Example I is placed in an appropriate continuous isomerization reactor maintained at a reactor temperature of about 210° C. and a reactor pressure of about 250 p.s.i.g. Methylcyclopentane is continuously passed to this reactor with a substantial conversion to cyclohexane being observed.

I claim as my invention:

1. A process which comprises isomerizing an isomerizable hydrocarbon at isomerization conditions in contact with a catalytic composite comprising a combination of a platinum group component and a tin component with a porous carrier material, said catalyst having combined therewith a sulfur component in an amount of about 0.05 to about 0.5 wt. percent sulfur, calculated on an elemental basis.

2. The process of claim 1 further characterized in that said catalytic composite contains, on an elemental basis, about 0.01 to about 1.0 wt. percent platinum group metal and about 0.01 to about 5.0 wt. percent tin.

3. The process of claim 1 further characterized in that said carrier material is a refractory inorganic oxide.

4. The process of claim 1 wherein said catalyst has combined therewith, on an elemental basis, about 0.1 to about 5.0 wt. percent chlorine or fluorine.

5. A process which comprises isomeriznig an isomerizable hydrocarbon at isomerization conditions in contact with a catalytic composite comprising a combination of a platinum group component and a tin component with a porous carrier material, said catalytic composite having combined therewith about 1 to about 100 wt. percent Friedel-Crafts metal halide calculated on a Friedel-Crafts metal halide-free composite.

6. A process which comprises isomerizing an olefinic hydrocarbon at isomerization conditions in contact with a catalytic composite comprising a combination of a platinum group component and a tin component with a porous carrier material.

7. The process of claim 6 further characterized in that said platinum group metal is platinum, palladium, or a compound of platinum or palladium.

8. The process of claim 6 further characterized in that said refractory inorganic oxide is alumina.

9. The process of claim 6 further characterized in that said isomerization conditions include a temperature of about 0° C. to about 425° C., a pressure of about atmospheric to about 100 atmospheres and a liquid hourly space velocity of about 0.1 to about 10 hr.$^{-1}$.

10. The process of claim 9 further characterized in that said hydrocarbon is commingled with about 0.1 to about 10 moles of hydrogen per mole of hydrocarbon.

11. The process of claim 9 wherein said catalytic composite has combined therewith, on an elemental basis, about 0.1 to about 5.0 wt. percent chlorine or fluorine.

12. A process which comprises isomerizing an alkylaromatic hydrocarbon in contact with a catalytic composite comprising a combination of a platinum group component and a tin component with a porous carrier material, at a temperature of about 0° C. to about 600° C., a pressure of about atmospheric to about 100 atmospheres, and a liquid hourly space velocity of about 0.1 to about 20 hr.$^{-1}$.

13. The process of claim 12 further characterized in that said hydrocarbon is commingled with about 1.0 to about 25.0 moles of hydrogen per mole of hydrocarbon.

14. The process of claim 12 wherein said catalyst has combined therewith about 0.1 to about 5.0 wt. percent chlorine or fluorine.

15. The process of claim 12 further characterized in that said hydrocarbon is a $C_8$ alkylaromatic or a non-equilibrium mixture of $C_8$ alkylaromatics.

References Cited

UNITED STATES PATENTS

| | | | |
|---|---|---|---|
| 3,511,888 | 5/1970 | Jenkins | 260—673.5 |
| 3,165,479 | 1/1965 | Burk et al. | 252—466 P X |

CURTIS R. DAVIS, Primary Examiner

U.S. Cl. X.R.

260—683.2, 683.65